(12) United States Patent
Jonsson

(10) Patent No.: US 8,594,418 B2
(45) Date of Patent: Nov. 26, 2013

(54) IMAGE PROCESSING

(75) Inventor: Michael Donvig Jonsson, Vallensbaek Strand (DK)

(73) Assignee: Adobe Systems Incorporated, San Jose, CA (US)

( * ) Notice: Subject to any disclaimer, the term of this patent is extended or adjusted under 35 U.S.C. 154(b) by 1866 days.

(21) Appl. No.: 11/816,526

(22) PCT Filed: Feb. 16, 2006

(86) PCT No.: PCT/DK2006/000096
§ 371 (c)(1),
(2), (4) Date: Aug. 16, 2007

(87) PCT Pub. No.: WO2006/086991
PCT Pub. Date: Aug. 24, 2006

(65) Prior Publication Data
US 2008/0205796 A1    Aug. 28, 2008

(30) Foreign Application Priority Data
Feb. 16, 2005 (EP) ..................... 05388013

(51) Int. Cl.
*G06T 5/00* (2006.01)
*G06K 9/00* (2006.01)
*G06K 9/03* (2006.01)
*G06K 9/62* (2006.01)
*G09G 5/00* (2006.01)
*G09G 5/02* (2006.01)

(52) U.S. Cl.
USPC ........... 382/162; 382/163; 382/167; 382/311; 345/581; 345/582; 345/589; 345/597; 345/600; 345/619; 345/649; 345/658

(58) Field of Classification Search
CPC ............. G06K 9/00; G06K 9/03; G06K 9/62; G09G 5/00; G09G 5/02
USPC .......... 382/311, 162, 163, 167; 345/156, 581, 345/582, 589, 597, 600, 619, 649, 658
See application file for complete search history.

(56) References Cited

U.S. PATENT DOCUMENTS

| | | | |
|---|---|---|---|
| 5,469,188 A * | 11/1995 | Krishnamurthy et al. | 345/618 |
| 6,181,836 B1 * | 1/2001 | Delean | 382/302 |
| 6,281,872 B1 * | 8/2001 | Cariffe | 345/658 |
| 6,904,185 B1 * | 6/2005 | Wilkins et al. | 382/311 |
| 7,042,583 B1 * | 5/2006 | Wilkins et al. | 358/1.15 |
| 7,046,258 B1 * | 5/2006 | Naito et al. | 345/619 |
| 7,209,149 B2 * | 4/2007 | Jogo | 345/622 |

(Continued)

OTHER PUBLICATIONS

European Patent Office, Application No. 10010706.9, filed Feb. 16, 2005, in European Search Report, mailed Nov. 3, 2010, 7 pages, to be published by USPTO.

(Continued)

*Primary Examiner* — Matthew Bella
*Assistant Examiner* — Jose M Torres
(74) *Attorney, Agent, or Firm* — Wolfe-SBMC

(57) ABSTRACT

In a method for editing a digital image by computer, operating controls for controlling properties are offered on a monitor; modifications of the image are formed in one step and modifications are applied to the image in a subsequent step. Operating controls for each type of modification are operative simultaneously. An apparatus for working the method as well as computer program products are disclosed.

24 Claims, 4 Drawing Sheets

(56) References Cited

U.S. PATENT DOCUMENTS

| | | | | |
|---|---|---|---|---|
| 7,215,813 | B2* | 5/2007 | Graves et al. | 382/167 |
| 7,356,202 | B2* | 4/2008 | Hoshino | 382/303 |
| 7,441,182 | B2* | 10/2008 | Beilinson et al. | 715/229 |
| 7,522,826 | B2* | 4/2009 | Nomura et al. | 396/55 |
| 7,593,603 | B1* | 9/2009 | Wilensky | 382/311 |
| 7,945,541 | B1* | 5/2011 | Schendel et al. | 707/695 |
| 2003/0090690 | A1* | 5/2003 | Katayama et al. | 358/1.9 |

OTHER PUBLICATIONS

"Phase One Capture One DSLR Preview: Digital Photo Review" [Online] Nov. 11, 2002, pp. 1-4, retrieved from the internet: http://www.dpreview.com/news/0211/02110901captureonepreview.asp [retrieved on Nov. 16, 2007].

"Review: Capture One Pro" [Online] Dec. 2005, pp. 1-9, retrieved from the internet: http://www.planetneil.com/faq/capture-one.html [retrieved on Nov. 16, 2007].

"Capture One DSLR; Phase One Magic" [Online] Dec. 2002, pp. 1-11, retrieved from the internet: http://www.luminous-landscape.com/reviews/cameras/1ds/capture-one.shtml [retrieved on Nov. 16, 2007].

"Technical Report: Software for High-Speed RAW Image Processing and Real-Time Editing" [Online] Jul. 2004, pp. 1-6, retrieved from the internet: http://www.canon.com/camera-museum/tech/report/200407/200407.html [retrieved on Nov. 16, 2007].

Schneider, W., et al., "Real-time visualization of interactive parameter changes in image processing systems" Proceedings of the SPIE, SPIE, Bellingham, VA, US, vol. 3017, 1997, pp. 286-295.

* cited by examiner

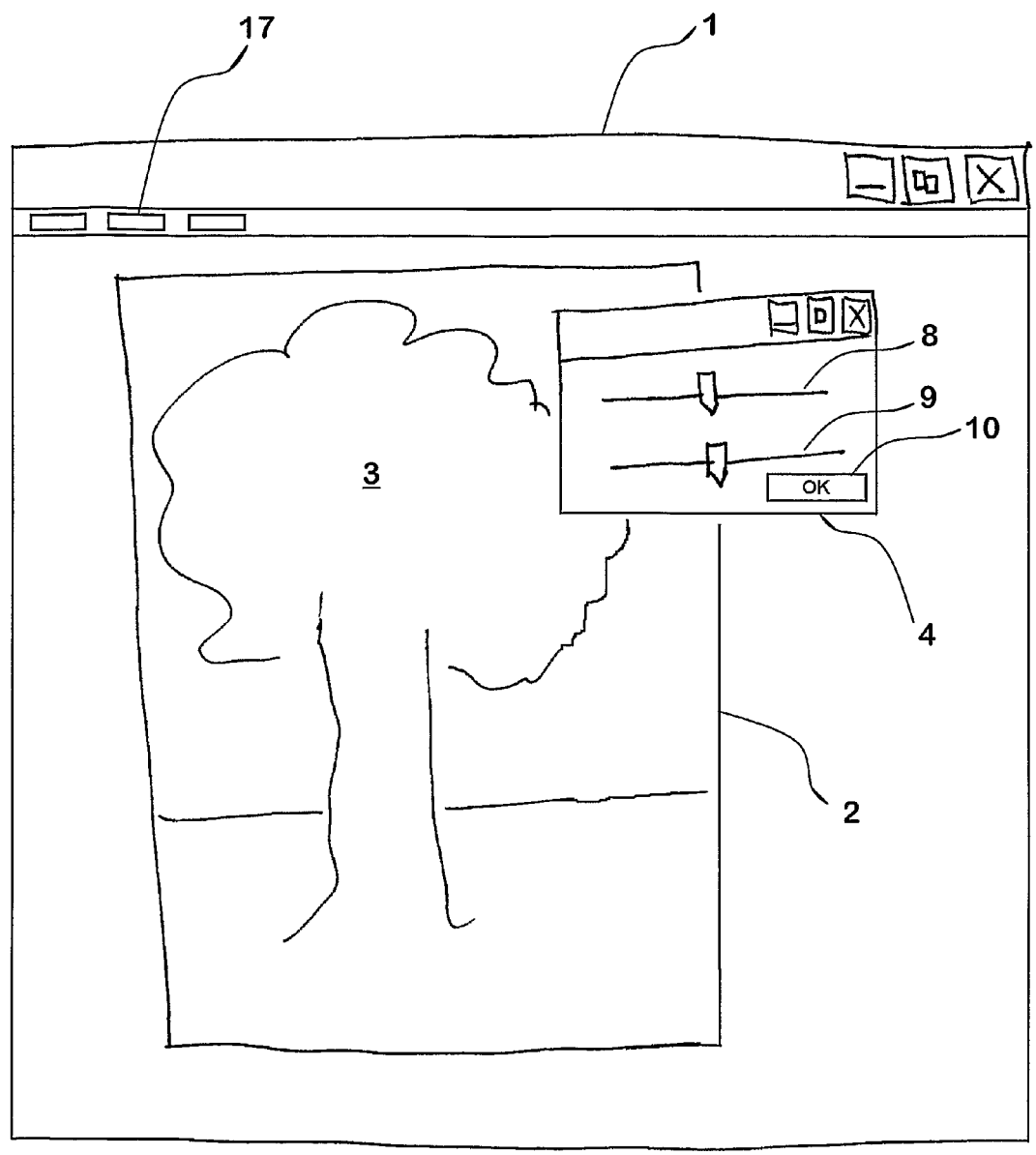
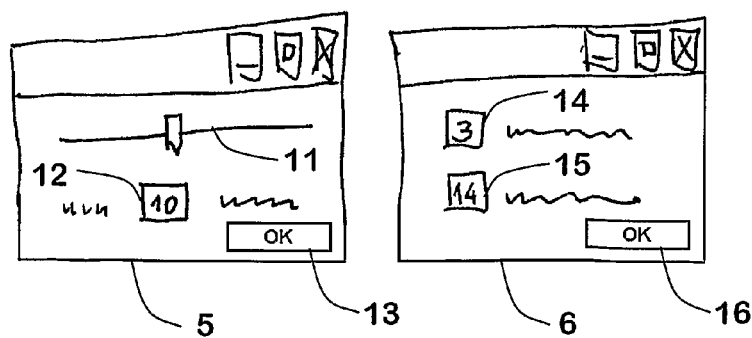
Fig. 1
(PRIOR ART)

(PRIOR ART) *Fig. 3*

IMAGE PROCESSING

The present invention relates to methods for processing digital, pixelised images in a program running on a digital computer, as well as an apparatus and a computer program product for the same purpose and a distributable computer program product for working either of the methods.

Such processing of a digital image (an image file) is performed in order to enhance the image or to correct defects in the image. A typical example of such an image is a digital photograph not satisfying the user in certain respects; it may be over- or underexposed, have too much or too little contrast, contain unwanted elements, persons or animals may have "red eyes", etc., etc. Other types of digital images than photographs may be subject to similar enhancement or correction.

Various steps or elements—designated "modifications" in the following—in the processing of the image may be categorised into different types of modifications. Mere examples of such types are: Tonality and Colour functions; Pixel Interchange (swapping (mirroring) and 90° rotation); Rotation; Form transformations (stretching, etc.); Magnification; Sharpening; Noise Reduction; and "Special Effects" (blurring, embossing, edge detection, pixelising, etc.). Each type will comprise a number of related modifications that may be applied to a source image in order to obtain a desired target image.

In the present text, the phrase "original image" is used for the first image, that is, the image that is available at the beginning, when the computer or the program is being started. The phrase "final image" is the image obtained, comprising all the modifications made with the use of the program; the image is now ready for use, respectively for any further processing made outside the program. The phrases "source image" and "target image" are used for the starting point and ending point, respectively, of any modification or group of modifications made inside the program. The target image of one modification process will then be the source image of any next modification process, etc.

Methods and associated programs of the type indicated above are known. An example of such a program for professional use is Adobe® Photoshop®; examples of such programs for semi-professional or consumer use are Microsoft® Digital Image Suite, Paint Shop Pro (JASC® Software), PhotoImpact® (Ulead® Systems), as well as many others, including some "shareware" and "freeware" products.

In the mentioned programs and other known programs for the present type of purposes, control panels are utilised, having a modal behaviour. Control panels are windows presented to the user on the computer's monitor and having a number of "handles" or other operating controls to be manipulated via an input device of the computer, typically a pointing device such as a "mouse" and alternatively or optionally a keyboard.

The control panels have a modal behaviour in that they can be utilised one at a time only, and in that they each comprise operating controls for one type only of image modifications.

That is, using an image-processing program of the prior art, the user will only have access to operating controls from one type of modifications at any one time. He may e.g. adjust brightness, contrast and colour saturation iteratively, because these modifications belong to the same type (for any given program). The corresponding operating controls are then offered to him by the program in one and the same window; thus, they will be operative simultaneously. The user is not able to use them simultaneously in the proper sense of the word, because his pointing device or keyboard only allow him to move one operating control at a time (as the pointing device has e.g. only one pointer), but he may use them iteratively or randomly to his satisfaction, following which he is supposed to close this window.

While manipulating such operating controls, the user will generally see the corresponding modifications being applied to the image. That is, a copy of the source image is presented on the computer display device—below referred to as the "monitor"—and each modification is applied to this copy and thus visibly presented to the user.

Pressing an <OK>button in such an operating controls window or "control panel" will "execute" the modifications that correspond to the final settings of the operating control or "handles".

This will invoke the modifications visible on said copy of the source image being actually applied to the source image, and the resulting image is thus the target image for that type of modifications. The source image is deleted or simply overwritten in this process, as any further modifications are to be applied to the target image, now being the source image of the next modifications or types of modification chosen by the user.

The user will then close the control panel just used (or it may close upon using the <OK> button), and he is now ready for opening another control panel and make further modifications to the new source image from another type of modifications. If the process of generating the target image is time-consuming, however, the opening of the new control panel will generally not take place before the image-generating process has ended.

It is not possible in the prior art to have two or more control panels open—or active—at any one time. Normally, the user will have to "leave" the current control panel by clicking an <OK> button or similar (following which the previous source image will deleted or overwritten) before it will be possible to open another control panel. If it is possible to open a new control panel right away, the mere opening will execute similar steps plus the closing, or at least deactivating, of the previous control panel.

Only the target image (the next source image) will thus be available for applying the modifications controlled by the control panel of the next type of modifications.

In contrast to the above description, some image processing programs keep one or a few instances of target images before overwriting the original image or following generations of target images as a basis for so-called "undo" functions. Following a plurality of modifications, the original image and following images are however eventually lost.

Also known are programs for controlling scanning apparatus such as e.g. flat-bed scanners for use with personal computers, or professional, large-size scanning-camera apparatus.

In such programs, a type of non-modal behaviour of control panels is known. Most scanner control programs utilise control panel(s) for setting image parameters that will affect a scanning which is about to be made. The scanning proper is a separate electronic-mechanical process, and as such made in one single step and more or less independently or autonomously, at least from a scanner control program point of view. Thus, all the settings made in the control panel(s) are effected in this single step.

In most scanner control programs, a preview image is being shown when a new scanning is to be made. The optical scanning device makes a rather coarse, initial scan or "exposure" of the original image, which is on paper or similar and present on the scanner bed. A resulting, scanned, preview image is presented to the user on an associated computer monitor. A simulated image, based on this preview image is now being shown on the monitor while the controls of the control panel are being manipulated by the user, and thus giving the user an impression of the effect on a subsequent scanning caused by the actual setting of the controls. Subsequently, a proper scanning is being made upon an <OK> command or similar from the user.

Thus, the controls are set by the user in one step or one series of steps with aid from the simulated image on the monitor and subsequently, the settings effected in one next step.

Scanner control programs are however not suitable for image processing per se, because the original image is not in digital form; no image is in fact present in the program, or at the program's disposal.

As mentioned, a scanner control program only provides the user with a specialised scan of an original paper image (i.e., an analogue image), that is, a scan made at a low resolution and a high scanning speed—a so-called preview image—and only this image is transferred to the computer's memory. The program has no provisions for storing or handling a digital, pixelised, original image. In addition, the program has no provisions for presenting the preview image to the user at a more detailed resolution, in magnification or otherwise in a more detailed form.

Neither has a scanner control program source or target images as defined above present in the program or in the computer's memory.

The only task carried out by the scanner control program is the selecting and storing of a set of parameters, all usable by the scanner apparatus proper when performing the electronic-mechanical scanning process. The setting of these parameters are controlled by the user with aid from the display of the simulated image; the parameters define settings in the scanner's mechanical or optical systems and/or in the scanner's proprietary software, and these settings eventually cause the original image to be scanned to a file with a desired "filtering" and with desired modifications.

Certain modifications, such as resizing, are brought about by controlling the mechanical conveying of the scanning device and by controlling the transfer of image data from the scanning device to the scanner's proprietary software. Most often, this and similar types of modification are not simulated in the preview image.

One specialised program of the type presently in question is "Capture One" from the Danish manufacturer Phase One. This program converts a RAW digital camera output file to a JPEG picture file and at the same time allows editing of the image represented by the RAW file.

This program is i.a. known from the Internet page http://www.dpreview.com/news/0211/02110901captureonepreview.asp (4 pp.; EPO ref. No. XP 002336071). More detailed descriptions may at present be found at http://www.planet-neil.com/faq/capture-one.html and http://www.luminous-landscape.com/reviews/cameras/1ds/capture-one.shtml. These descriptions do not originate before the priority date of the present application, but they describe the same features of the same program as are mentioned in XP 002336071.

A RAW file is an image file in which the elements of the image are represented by output values from the camera sensor chip in the form supplied by this chip—that is, unprocessed sensor chip output data.

RAW files are used by i.a. professional photographers in order to obtain as unbiased and undistorted image data as possible from their digital camera, instead of outputting data from the camera in standardised image file formats, in which the image data will be more or less processed and/or compressed.

"RAW format" or "RAW files" are common designators for proprietary formats for data from a scanning chip, a camera chip, or a scanner head, as used by various manufacturers of such chips and such apparatus. Various RAW formats are of the same nature, but differ in detail from one manufacturer to the other.

It should be noted that the Capture One program is only capable of operating on a RAW format file as the original image. This fact will limit the usability of the program adversely as a general propose image-editing program.

In the Capture One program, the user is able to input all desired corrections by means of a plurality of control panels, arranged as a corresponding number of "tabs" within one window. In XP 002336071, these tabs may be seen in the second Figure; they are shown in more detail on page 3, designated "Capture", "Gray Balance", "Exposure", "Focus" and "Develop", respectively.

These control panels or tabs may be said to have a non-modal behaviour in the previously mentioned sense. That is, the modifications set in the control panels are effected in one single step.

However, the control panels in Capture One are indeed modal in the sense that only one of these tabs may be open at any one time. This is certainly a drawback for the user, preventing a true and undisturbed creative approach to the image editing.

The objective of the invention is to provide methods, apparatus and associated computer software for editing digital images (that is, images provided in the form of computer files), for enhancement of image quality or for any other purpose, with the provision of facilitating the use of the program for the user and enabling modification of various image properties to be made in any sequence.

A further objective of the invention is to provide computer software demanding less computer power and working faster as compared to prior art programs.

In a first aspect of the invention, these objectives are met in that a method for editing a digital, pixelised, original image by means of a program running on a digital computer, in order to obtain a desired, final image, where the editing comprises different types of modifications such as: pixel interchange (90° rotation, mirroring, etc.); tonality or colour modifications; geometric modifications (stretching, etc.); and blurring, texture or other "special effects" modifications; each modification being made to a source image in order to obtain a target image, is characteristic in that operating controls for controlling at least one modification from each of the possible types of modification are being offered to a user simultaneously, each of said operating controls being operative, and in that the source image is constituted by the original image and the target image is corresponding to the final image.

By the ability to manipulate controls for different types of modification in the same step, the need for more than one step will diminish and thus, the drawbacks of the many steps needed in image processing methods of the prior art will be avoided.

By these measures, the method becomes far more useful for the user, and becomes far easier to utilise in an intuitive manner. As the need for manipulating the controls in a specific sequence, which was dictated by the prior art's use of more than one step with each their "apply" command (such as <OK> buttons), is dispensed with in the present invention, the user obtains the possibility of returning to any operating control which he has manipulated earlier in the first step and to adjust that control once more.

Thus, the user needs no more be foreseeing which respect to which modifications need to be made to the original image and to the amount of adjustment of each control. He can make the adjustments in any sequence, and he may use the controls in any iterative or repetitive mode.

The user's attention may thus be directed from the method and its use to the image he is editing, improving convenience, efficiency and creativity.

Preferably, all operating controls for all types of modification are being offered to the user in one and the same window.

This measure will optimise the method as far as control-manipulating steps is concerned. The use of one step only for this purpose leaves the user with freedom to use the controls in an iterative or repetitive manner because they are all available in that single step.

It is particularly preferred that the operating controls are operable in any sequence and any combination.

This measure will provide the user with greater freedom to operate the controls in any manner; this freedom will direct the user's attention away from the formalities of using the program and enabling him to use his attention for the image processing to be made and for supporting his creativity.

All operating controls are preferably being offered to the user in one and the same window for such types of modification, the effects of which are assessable by the user from a representation of the modified target image as displayed on a computer display device of said digital computer with actual values of image display properties, such as resolution and magnification.

That is, if the display device, which presents the image to the user, is adjusted such in terms of resolution, magnification, etc., that the effect of any respective type of modification is not sufficiently legible to the user, then he will not be offered the operation control for that type of modification.

This is to ensure that the user will not inadvertently set some modifications, which he cannot control properly because he cannot assess the effect of those modifications in the image presented to him.

It is further preferred that the modified target image is presented continuously to the user.

As the user's attention must be directed towards the contents of the image and towards the processing to be made, it is important that the image is visible and perceptible without interruptions.

Preferably, a simulation of the modified target image is presented as the target image.

The display of a large image, which may be modified more or less continuously, may very well stress a less powerful computer to or beyond its limits. According to the invention, therefore, a simulated image may be presented instead of the target image. The simulation may be selected such that the resolution, etc. of the simulated image will suit the capability of the computer.

Preferably, in this connexion, the simulation of the modified target image is presented continuously to the user during the simulation process as well as thereafter.

It is considered better that the user will experience the simulation in progress than he will have to wait for the simulation to be completed before the image is eventually displayed. A simulation in progress will look much as if the picture is "growing" or "being made" before the eyes of the user.

The simulation of the modified target image will preferably have dimensions and/or resolution corresponding to a window in which it is presented to the user.

This measure will optimise the use of the computer's resources in that the simulated image will have exactly the degree of detail that the window is able to display without conversion or loss. At the same time, a conversion from the format of the simulated image to that of the window is avoided.

In a second aspect of the invention, the objectives mentioned above are met in that a method for editing a digital, pixelised, original image by means of a program running on a digital computer, in order to obtain a desired, final image, and comprising modification of selected individual image properties of the original image, operating controls for controlling said properties being offered to the user on a computer display device, is characteristic in that a combined set of modifications of the selected individual image properties is formed in one prior, first step and that, following a single command from the user, said modifications in said combined set are applied to the original image in one subsequent, second step to obtain the desired final image incorporating the desired modification of all selected properties.

The advantages of needing one step only for manipulating controls are commented on above with reference to the first aspect of the invention.

It is preferred that every image property that may be modified by the method is selectable in said first step.

This measure will support the benefits just mentioned in that only one proper processing of the image will be needed at all.

It is further preferred that the nature and number of properties selectable in said first step is dependent on the actual value of an image display property, such as resolution or magnification, of a representation of the original or the final image as displayed on a computer display device of said digital computer.

This measure will i.a. ensure that the user will not have access to controls working at a degree of detail which is cannot be appreciated by the user at the present view of the image under process, that is, the present magnification, colouring, etc.

In this connexion, it is preferred that all image properties that may be modified by the method are selectable in said first step at certain values of said image display property.

This will complete the method in that the user will have access to a certain view of the image under process, in which all desired modifications will be perceptible. The user may thus confine himself to working with only that view of the image under process.

In order that the method will be of more universal use, it is preferred that the modifications that may be made by the method comprises different types of modification such as: pixel interchange (90° rotation, mirroring, etc.); tonality or colour modifications; geometric modifications (stretching, etc.); and blurring, texture or other "special effects" modifications.

The more types of modification that are supported by the method of the invention, the higher the profit from the advantages of the method will be. Ideally, all thinkable types of modification would be supported.

The following preferred embodiments relate to both the first and the second aspect of the present invention.

It is generally preferred that the final image is generated by applying the modifications to the original image in a specific sequence, when the user signals that manipulating of the operating controls is finished.

It is well known that one sequence of applying modifications of different types to any specific image may yield a better result than another sequence. This will be caused by i.a. saturation phenomena; please refer to the embodiment examples.

This is one reason for the methods of the prior art only allowing application of the different types of modification (use the different modification windows) to the original or source image in a specific, recommended sequence.

By leaving this sequencing to the computer program employing the method of the invention, the user is relieved of this task and thus may concentrate on the creative tasks of modifying the image.

The user signals preferably that manipulating is finished by clicking an <OK> button or similar.

This is a widely known and accepted way of signalling.

Said specific sequence is preferably established as a stored standard sequence, and the application of certain modifications are preferably moved forwards or backwards relative to the standard sequence in dependency of analyses of properties of the original image and/or the modified target image.

It may very well be that a specific image or a specific set of modifications will benefit from the modifications being applied to the original image or source image in another sequence than the standard sequence. Most often, only a few modifications need to be moved in the sequence to yield the optimal result.

By leaving this task as well to the computer utilising the method of the invention, the user is relieved of one more task—in this case a rather difficult one, as such analysis of image contents have to be made to very strict rules and strategies in order to provide reasonable results.

In order to meet a specific need of the professional market, the method has preferably provisions for handling the original image as a file in RAW format such as any proprietary format from a scanning chip, a camera chip, or a scanner head.

As the method of the present invention is particularly well suited for providing an image-processing computer program of high quality, it may be utilised firstly in such programs. In this connexion, it is considered particularly advantageous to include the mentioned feature in the method.

In one embodiment, it is thus preferred that the original image is provided as a standardised image file, such as a file in the JPEG or the TIFF format.

These image file types are widely used for storing and distributing digital photographic images, so this feature will contribute to the universal compatibility of the method of the invention.

Experiments have in fact shown that certain programs based on the method of the invention are particularly well suited for processing the mentioned RAW format image files.

In this connexion, it is preferred that the original image is in the form of either of a sensor chip output data file (a RAW format file) and a standardised image file.

The use of RAW format files is growing among professional photographers, and thus becoming increasingly important. Adding the ability for the method of the invention to accept RAW format files as original images will enhance the compatibility of the method of the invention in the market for professional photography.

In a preferred embodiment, the original image is in the form of a standardised image file in the JPEG or the TIFF format, and information is stored in that file according to the rules for storing additional information in files in that respective format, said information being usable by the program for "undoing" previously made modifications to the image.

This feature will enable use of the method of the invention for later editing of images without substantial loss of image quality.

Many types of modification to images, and indeed many types of storing images as compressed files reduce image quality by considerable amounts. Modifying and storing an image these ways therefore prevent later editing of the image without even more loss of quality, unless a master image copy is retained, containing the image in its original, unmodified quality. However, such storing entails increased administration and increased use of storage media.

By the measures of this embodiment, only the modified copy (the final image) needs to be stored, as it may contain information for undoing the previous modifications and thus re-establishing the image in its original, non-degraded quality.

In this way, convenience is increased substantially for the users of the method of the invention, as only one instant of the image needs to be retained, stored and distributed for any purpose.

In another preferred embodiment, the final image is in the form of a standardised image file.

This feature will entail similar advantages as mentioned above with respect to the original image file.

In yet a preferred embodiment, the final image file is supplemented with information characterising the modifications that have been made to the original image.

In particular, the final image file may be in the JPEG or TIFF formats, and the characterising information stored in that file according to the rules for storing additional information in files in that respective format.

These two embodiments entail corresponding advantages as mentioned above with respect to storage of an image file containing similar information.

In a third aspect of the invention, the objectives mentioned above are met in that an apparatus for editing a digital, pixelised, original image by modification of selected individual image properties of said original image to obtain a desired final image, said image properties including tonality and colour, pixel interchange, geometric and/or special effects properties, the apparatus comprising: an input storage for storing a digital original image file; input equipment such as a computer mouse, a keyboard and a monitor for selecting modification of individual image properties; modification software for modifying said selected individual image properties; application software for applying said modifications of individual image properties to the source image to produce said target image; and an output storage for storing said target image; is characteristic in that said application software is adapted to applying said selected modifications of individual properties of the source image in one single operation, whereby a desired final image is obtained, incorporating all said selected modifications of properties.

With these measures, an apparatus is provided that is perfectly suited for editing such digital images. The apparatus may be completed using readily available hardware combined with software made according to the methods of the invention.

The input means comprise preferably a computer with software adapted for simultaneous display of operating control icons or "handles" corresponding to every image property that may be modified by means of the apparatus.

Also preferred is that the modification software is adapted to applying said modifications of individual properties in a certain, predetermined sequence, and the apparatus comprises a storage for corresponding sequence information.

Preferably in this connexion, the predetermined sequence may be amended in dependence of analyses of certain properties of the original image or a simulation of the final image, such as luminance of portions of said image.

These measures provide similar advantages as stated above with reference to the methods of the invention.

It is generally preferred that the apparatus is comprising a computer display device having a resolution of at least 1200× 1600 pixels.

This will ensure that the user will in fact have the possibility to view images at a fairly large magnification and in great detail, and so will have all operating controls available from the program working the method of the invention, while being able to view a larger part of the image than with a monitor having a lower resolution.

It is preferred as well that the software comprises software for decoding the original image in the form of either of a sensor chip output data file (a RAW format file) and a standardised image file.

Also preferred is that the software comprises software for coding the final image in the form of a standardised image file.

These embodiments entail corresponding advantages as explained above with reference to the methods of the invention.

In a fourth aspect of the invention, the objectives mentioned above are met in that a computer program product for editing a digital, pixelised original image by modification of selected individual image properties of said original image to obtain a desired final image, said individual image properties comprising tonality and colour, pixel interchange, and geometric and/or special effects properties; the program product including software components for selecting and modifying individual image properties of the original image and for applying corresponding modifications of said individual image properties to the original image, is characteristic in that defining software components are provided for letting the user define a set of desired modifications of all selected individual image properties in a single, prior method step, and that application software components are provided for applying said set of desired modifications of properties to the source image in a single, subsequent method step to obtain a desired, final image incorporating desired modifications of all selected properties.

These measures will ensure corresponding advantages as explained above with reference to the methods of the invention.

It is particularly preferred that said defining software components are adapted to receiving inputs in any sequence, as well as iteratively or repeatedly, from the user for defining modifications of individual image properties, and to storing corresponding modification values in a specific order or sequence.

By these features, it is attained that the user may change his mind as needed or desired when setting the operating controls, and then set the controls at alternative settings, should he not be satisfied with the view of the final or target image, or the simulation of the final or target image.

This will in particular be a great advantage to the inexperienced user or the user working in a very creative or non-systematic way. In the image processing software of the prior art, the user will be more or less forced to structure his thoughts or strategy in a rather systematic way as all controls belonging to one type of modification will have to be set, before controls belonging to other types may be offered for manipulation.

It is preferred as well that said application software components are adapted to execute application of modifications of image properties in a certain, predefined sequence.

The program product comprises preferably analysis software components for analysing certain image properties such as luminance of areas, preferably of a simulation of said final image.

In this connexion, said application software components are preferably adapted to redefine said sequence in dependence of analyses of image properties from said analysis software.

These measures provide corresponding advantages as explained above with reference to the methods of the invention.

It is generally preferred that the computer program product further comprises simulation software components for simulating a final image in dependence of modification values generated from inputs from the user, and for displaying a resulting simulated, final image on a computer display device.

In this connexion, it is preferred that said simulation software components are adapted to generate said simulated, final image with a resolution corresponding to a window defined by the user on said computer display device.

These measures as well provide corresponding advantages as explained above with reference to the methods of the invention.

In a fifth aspect of the invention, the objectives mentioned above are being met in that a distributable computer program product is adapted to working any of the methods mentioned above.

At present, the majority of software is distributed for use on standardised computers such as personal computers. When the methods of the invention are to be worked on such standardised computers, the software will be distributed alone, or separated from any hardware. The measures mentioned provides for this.

It is preferred that the program is distributed on a physical storage medium such as an optically readable disc.

It is alternatively preferred that the program is distributed as a signal transmitted by means of a suitable transmission channel such as a computer network and/or a telephone line.

These measures provides for the software being distributed in commercially attractive ways.

The invention will be explained in more detail below, with reference to embodiment examples and to the drawings, in which:

FIG. 1 is a window on a computer monitor illustrating a configuration of an image-processing program of the prior art;

Same reference designations refer to same or similar elements in all drawings.

Figure 2:
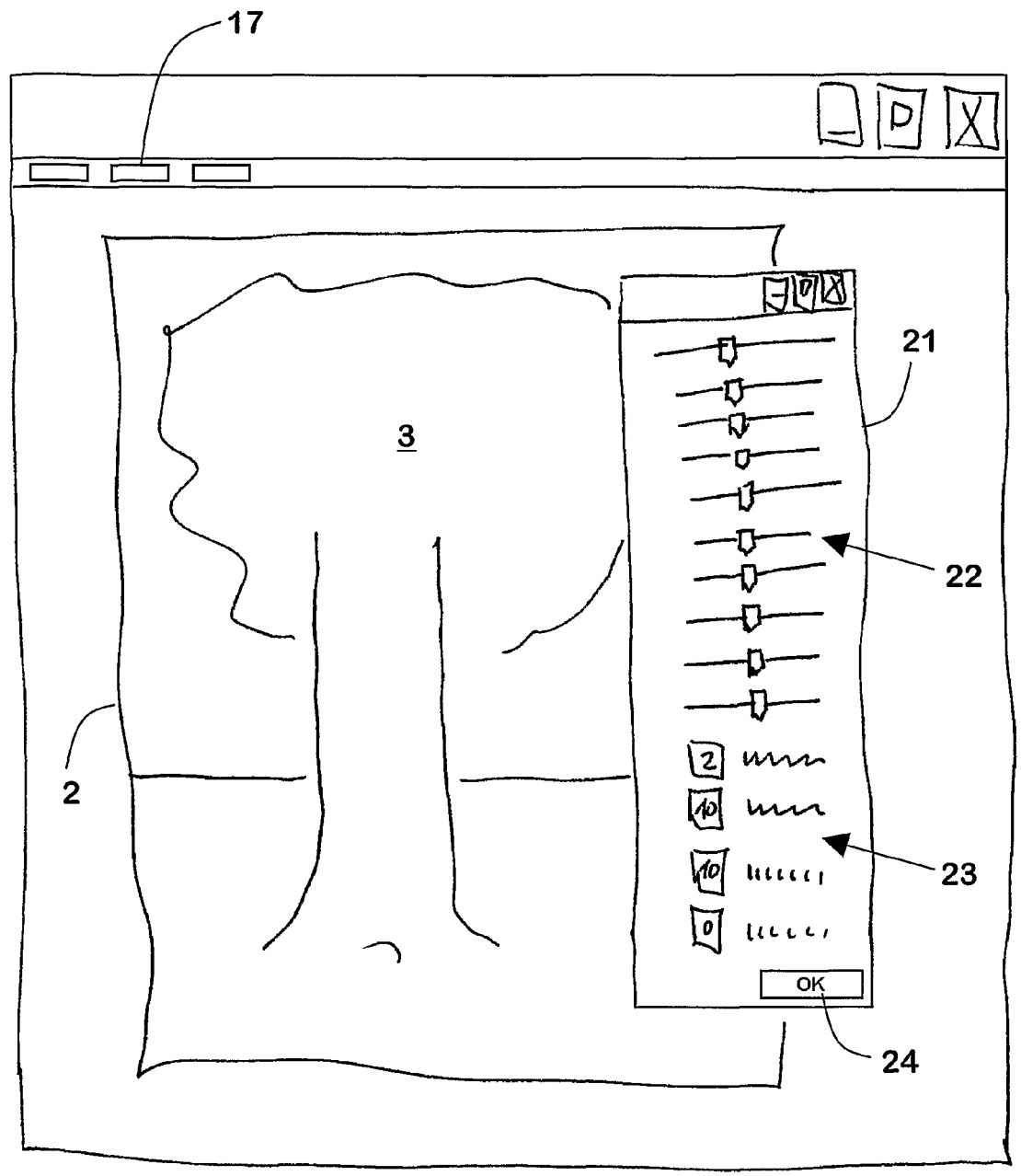
FIG. 2 is a similar window illustrating a corresponding configuration of an image-processing program according to the present invention.

In FIG. 1, an imaginative monitor image from an archetypal image-processing program of the prior art is illustrated. For the sake of simplicity, the program is assumed to be able to handle three possible types of modification only. The program is running on a computer and displaying a window 1 on the computer's monitor (display device). An image file (a digital image) has been loaded into an area of the computer's memory as an original image to be edited (processed) by means of the program. The original image—or a copy of it likewise loaded into an area of memory—is displayed by the program in a window 2, and is now a source image 3 for a modification to be initiated by the user. In more detail, the actual image 3 seen in the window 2 may be a simulation of the original image, or an upsized or downsized copy of the original image. In other words, the source image may have undergone certain modifications for the sole purpose of being shown in a window 2 on the monitor screen. If the image displayed is part of the actual image to be edited, there will probably be scroll panels in the window 2.

One control panel 4 of three possible control panels 4-6 is open, and the operating controls 8-9 and the <OK> button 10 in this control panel 4 are operable.

A desired modification may now be set by the user, manipulating the two operating controls 8-9, and the desired modification executed by clicking the <OK> button 10. As long as the control panel 4 is open, the two operating controls 8-9 may be manipulated as desired, repeatedly or iteratively. In good quality prior art programs, the source image 3 will reflect the manipulating of the operating controls 8-9 as near real-time as practically possible.

When the user is satisfied with the modified source image 3, the <OK> button is clicked and a target image generated, based on the source image and the modifications. In this connexion, the continuously displayed, modified image may be utilised for creating the target image, or the displayed image may be discarded and the defined modifications carried out on the source image proper.

In any case, the original image as well as the source image will in most cases be deleted by now. Some programs retain source images one or a few steps back, and the original image will be stored as a file, but it is not known to store all the intermediate source images.

It might be possible—and it may be known in the prior art—to have more than one control panel open simultaneously. In this case, only one control panel would be active at any one time. This has the same consequence: only the operating controls of that control panel will be operative. Operating controls in closed or inactive windows are never operable. In this case it would either be necessary to click an <OK> button in the activated control panel before activating another control panel, or the mere activating of another control panel will invoke finishing the target image of the previous control panel, with associated steps as per above.

In either case, when the control panel is closed or made inactive by clicking the <OK> button, one previous source image will in general become lost (most often by overwriting).

The three control panels 4-6 are illustrated as being of slightly different design. The control panel 4 has two sliding handles 8-9 as its operating controls, while the control panel 5 has one sliding handle 11 and one number value input field 12 as well as the <OK> button 13 and the control panel 6 has two number value input fields 14-15 as well as the <OK> button 16.

The control panels 4 and 5 might typically be for manipulating colour or tonality, while the control panel 6 might be for inputting values for "special effects" modifications.

The control panels 4-6 may each be opened from a drop-down menu opened by means of a menu button 17. This and many other ways of controlling windows are known in the art.

Figure 3:
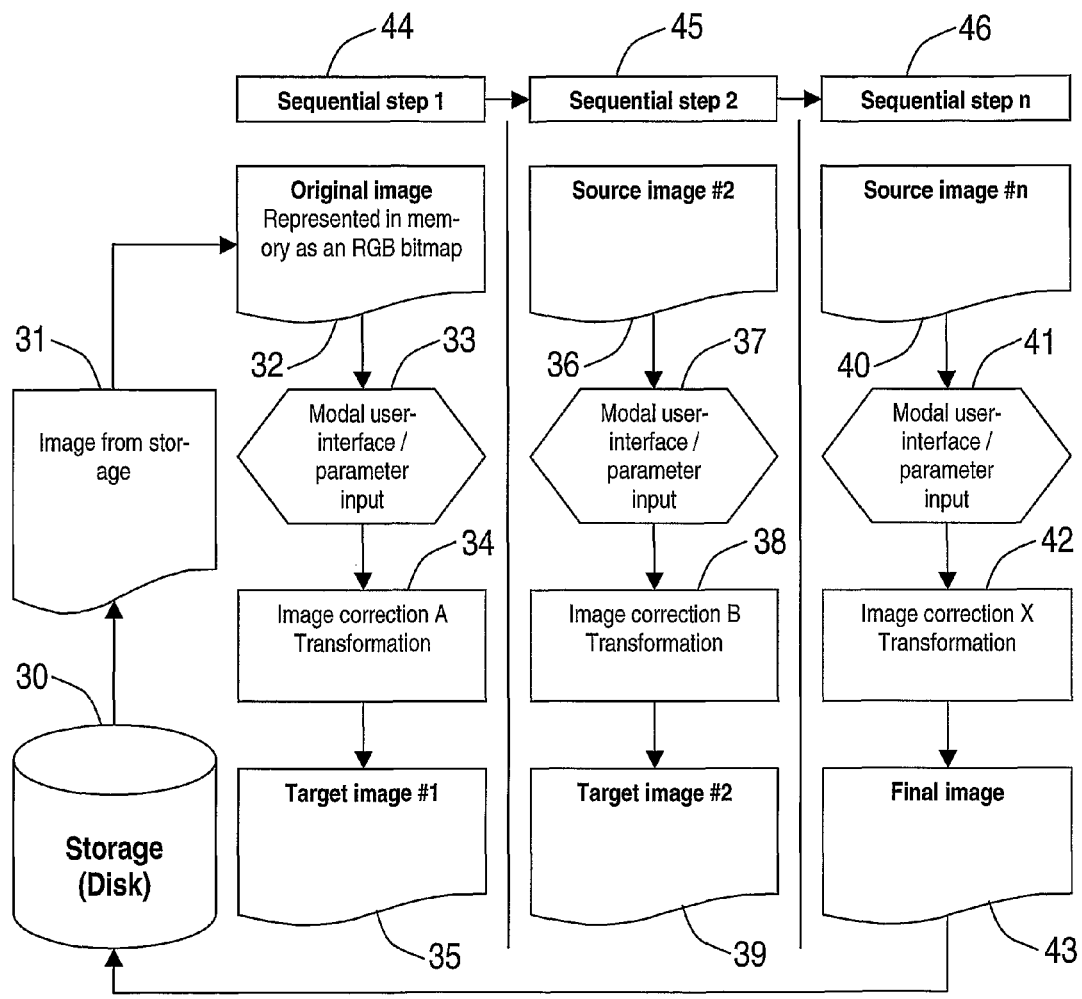
FIG. 3 is a schematic diagram illustrating the processes of an image-processing program of the prior art.

The mode of operation of an archetypal prior art image processing method is further illustrated in FIG. 3.

The digital image to be edited is stored on a storage medium such as a disk 30. It is taken from the disk 30 (at 31) and stored in memory as an original image 32 (and for sequential step 2 and sequential step n, source image #2 (36) and source image #n (40), respectively).

The editing proper is conducted as a series of consecutive sequential steps 44-46. In the first step 44, parameters are input by means of the modal user interface 33 (parameters are input by means of modal user interfaces 37 and 41 for sequential step 2 (45) and sequential step n (46), respectively) described above with reference to FIG. 1 (i.e., e.g. the control panel constituted by the window 4). When the relevant parameters are input by the user, and he clicks the <OK> button 10, the transformation designated "image correction A" is initiated. The output from this transformation is the target image No. 1 (35).

Sequential editing steps 2 to n take place in the same manner, sequential step 2 corresponding to e.g. control panel 5 (FIG. 1), and sequential step n corresponding to e.g. control panel 6 (FIG. 1). The result is the final image 43, which is eventually stored on the disk 30.

This prior art method will not allow any other image correction to take place until the current correction has been either completed successfully or terminated by user intervention. This is known as a modal type of operation of this prior art method.

Both the target image No. 1 and the target image No. 2 (39) are in fact stored as well, either on the disk 30 or in the computer's memory (not shown).

Each time one of the images is stored in this way, a certain loss will occur, because the image will undergo certain compression, resizing and/or other modifications as an intrinsic part of the storing process. This phenomenon is well known in the art, an is often referred to as "compression loss".

As a result, each sequential step 44-46 in the prior art methods will incur a certain compression loss, and these losses tend to accumulate to form greater losses as the process in FIG. 3 proceeds.

FIG. 2 illustrates an embodiment example of the program of the present invention, by illustrating similar elements and situations, as does FIG. 1 for the archetypal prior art program.

An original image or source image 3 is thus being shown to the user in a window 2. If the image displayed is part of the actual image to be edited, there will probably be scroll panels in the window 2. One control panel 21 may be opened (e.g. by utilising a drop-down menu from menu button 17) containing all operating controls being available in the program for controlling modifications to the source image 3.

In the embodiment shown, the control panel comprises ten sliding handle controls 22 and four number value input field controls 23.

In general, the control panel 21 will comprise all the operating controls that are available for the editing of the original image within the program of the present invention.

The controls 22-23 may be manipulated or filled in, respectively, in any sequence and in any combination. Of course, many combinations of settings will produce useless images, but no restrictions are put onto the user regarding the use of the controls. Once manipulated or filled in, the position or the value, respectively, may be changed or amended as desired when the user changes his mind regarding any given operating control.

This may e.g. be the case when the user is editing an image for both colours, sharpness and cutting. It may thus be that one cutting will call for one set of colour amendments while another cutting (with a different image content) may call for another set of colour amendments.

As opposed to the situation with the prior art program in FIG. 1, this renders the user with the freedom to organise or structure his use of the controls 22-23 as desired—or to use no structure or system at all.

Creative persons very often look upon rules for manipulating controls, or using tools or aids, as restraining their creativity; this point of view tend to be acknowledged by the person skilled in psychology and use of creativity. Thus, a computer program which renders the user with an increased freedom to operate the program's controls, etc., as desired, will be deemed to enhance or support the creativity of the user to an increased degree.

In the case of the present invention, the increased freedom to operate the controls 22-23 as desired may not only increase the room for the user's creativity, but will most certainly be beneficial to the inexperienced user. The inexperienced user will not have the ability to foresee which modifications will at all be necessary to a certain original image, and thus, he will not make use of the operating controls in any prescribed sequence or manner.

A typical set of possible image modifications (that is, some of the controls 22-23) will i.a. comprise the following:

1) Brightness corrections; and

2) Contrast corrections: These are typically spatially uniform, non-linear transformations (or spatially non-uniform if localized to certain areas of the image).

3) Colour corrections (i.e., Hue/Saturation): This is typically a spatially uniform matrix-transformation (or spatially non-uniform if localized to certain areas of the image).

4) Sharpness or de-blurring corrections; and

5) Noise suppression: These are typically spatially uniform and adaptive convolution transformations (or spatially non-uniform if localized to certain areas of the image).

6) Removal of image blemishes (spots/streaks etc.): This is typically a spatially non-uniform adaptive convolution transformation.

7) Image rotation by any right angle; and

8) Mirroring relative to right-angle axes: These are simple pixel-interchange transformations.

9) Image rotation by an arbitrary angle; and

10) Geometric distortion and scaling: These are affine transformations.

Figure 4:
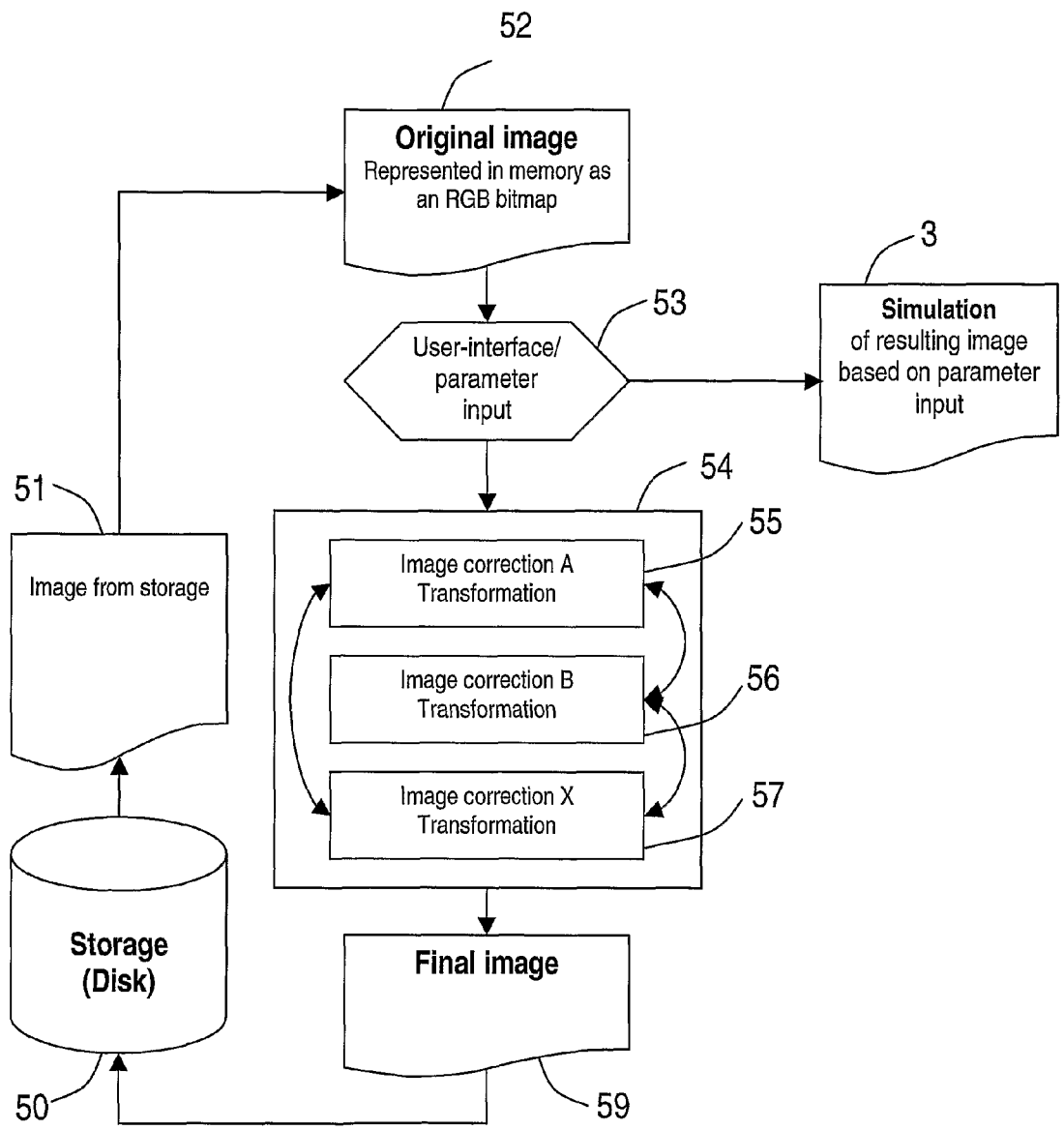
FIG. 4 is a schematic diagram illustrating the processes of an image-processing program according to the present invention.

The mode of operation of an image processing method according to the invention is further illustrated in FIG. 4.

The digital image to be edited is stored on a storage medium such as a computer disk 50. It is taken from the disk 50 (at 51) and stored in memory as an original image 52.

The editing is essentially conducted in only two consecutive steps 53-54. In the first step 53, parameters are input by means of the user interface described above with reference to FIG. 2 (i.e., the control panel constituted by the window 21).

In the first step 53, the user has continuous access to a simulation 3 of the final image in the window 2. That is, he will utilise the image 3 in the window 2 as guidance when setting the desired modification parameters by means of the operating controls 22-23 in the control panel 21.

The image 3 may be magnified if necessary to assess the modifications of the simulated, final image 3. If any of the controls 22-23 will only be useful for modifications which need a magnified view to be appreciated by the user, such controls may be inactivated (e.g., dimmed) until the view of the simulated, final image 3 is set at the necessary magnification.

The image 3 is generated on the basis of the original image, corrected with simulated results of the modifications defined by the settings made by the user in the first step. The image 3 is corrected as near real-time as possible, so that the user will immediately see the result of his manipulating the operating controls. In practice, the simulation process may take some time and in this respect, it is preferred to show the image 3 even during the simulation process. For the user, this will look as if the new image is "growing" from the previous image.

When the user is satisfied with the results as viewed in the simulated image 3, he will press the <OK> button 24 (FIG. 2), which will initiate the completion of the second step 54 (FIG. 4).

In the second step 54, similar processes 55-57 to the processes 34, 38, 42 in FIG. 3 will be executed. The processes will however be interrelated as described above, and in examples 1-3 below.

The second step 54 renders the final image 59, which is stored on the disk 50.

Apart from the general advantages mentioned above, the methods of the invention entail certain specific benefits as opposed to the prior art.

In general, information about all correctional parameters set in the first step will be accessible to all individual transformations taking place in the second step. This means that when a transformation is ordered by the user by setting a control, e.g. in the window 21, information about this transformation is available, and at the end of the first method step, information about all ordered transformations are available to the computer program working the method.

Thus, it will be possible to adjust parameters of any of the ordered transformations, using knowledge about parameters of the other transformations.

EXAMPLE 1

Some relevant examples of computer-initiated corrections of user-selected modification values are:

1) A change to brightness can automatically lead to a change of the amount of noise suppression being applied. For instance, a user-selected level of noise suppression can automatically be decreased if the user lower the brightness or increases the contrast.

2) A change to contrast can automatically lead to a change in saturation. For instance, a user-selected saturation level can automatically be decreased if the user increases the contrast.

3) A change to the image size (scaling) can automatically lead to a change of the amount of sharpness being applied.

Such corrections would not be possible at all in the prior art, as any sequential step n can have no knowledge about any sequential step n+1 that may be taken and the set of correctional parameters specified during such a future event.

With the methods and programs according to the invention, it is possible to combine familiar transformations in order to gain performance and/or avoid or minimize errors caused by quantisation of discrete values.

EXAMPLE 2

Some relevant examples of familiar transformations which may be combined in this manner are:

1) A change to brightness and a change in contrast can be combined and expressed as one piecewise non-linear function.

2) A change to sharpness and a change in noise suppression can be combined and expressed in one set of kernel-coefficients used for convolution.

3) A change in hue and a change in saturation can be combined and expressed as one matrix operation.

The prior art methods do not promote the possibility of combining familiar transformations; this is due to the flow of operation (FIG. 3).

With the methods of the invention, it will be possible to avoid the repetition of any individual transformation. This promotes faster operation and less loss of quality cased by quantization.

In the prior art methods, one or more of these transformations are, often and unavoidably, performed several times by the average user.

With the methods of the invention and depending on the correction(s) made, it is possible to apply correction(s) in such way that only a subset of the image data originally represented in a compressed form (with a compression method involving losses of pictorial information) is modified when the image data are written back to permanent storage.

EXAMPLE 3

The inherent advantages of the invention, that all transformations are actually made subsequent to the user inputting a complete set of parameters for all modifications to be made, provides for further advantages when modifying e.g. digital images in the form of JPEG files.

JPEG (and similar) files are encoded in the domain of the discrete cosine transform. Luminance information is kept separate from the chrominance information.

1) If only changes are made to the luminance content of the image (i.e. sharpening, brightness and contrast corrections) it is only necessary to perform decoding and re-encoding of this subset of information, limiting the adverse effect of repeated decompression and compression.

2) If only changes are made to the chrominance content of the image (i.e. colour corrections) it is only necessary to perform decoding and re-encoding of this subset of information, limiting the adverse effect of repeated decompression and compression.

In a particularly preferred embodiment of the invention, the final image is stored as a standardised image file having capability for storing supplementary, desired information, such as e.g. the JPEG and TIFF image file formats. Such formats have "room" for storing information, which is most often comments to the image content or similar.

According to this embodiment of the invention, information describing the performed modifications to the source image is stored in the final image file. To the extent, that such modifications are reversible, the original image may then be restored by "undoing" the modifications that have been made to the original image in order to obtain the final image.

This feature will entail essential benefits for the user in that he will not need to store the original image separately and to distribute the original image to other users needing to perform further modifications to the final image. Such users will be able to restore the original image and to perform their own, desired editing of the original image, or they will be able to undo specific modifications contained in the final image as distributed.

Thus, the final image file, made according to this embodiment of the invention, will serve as well as a back-up copy of the original image, ultimately making such back-up copies unnecessary.

The methods and computer programs of the invention will demand less computer power and will operate faster, as compared to the prior art, as only the simulated image 3 is to be generated by the computer—no handling of image files, which are large as far as high quality digital images are concerned, will actually take place before the second step 54, when the work of the user is finished, and his attention not needed any more. Thus, the user will not experience the generating time for the final image as any annoying delay.

With the methods of the invention, it is possible to take the commutative nature of individual corrections into account and to let the computer program apply the corrections in an optimal sequence; the user has no control over the order in which individual processing steps are performed internally.

The invention claimed is:

1. A method of editing a digital image, the method comprising:
determining which of a plurality of operating controls are supported by capabilities of a computing system relative to which the method of editing the digital image is performed, the plurality of operating controls corresponding to a plurality of graphical modification categories;
concurrently presenting the operating controls that the capabilities of the computing system are determined to support;
receiving modification parameters through the operating controls that indicate graphical modifications to be performed on a source image and include a first modification parameter corresponding to a first said graphical modification category and a second modification parameter corresponding to a second said graphical modification category;
combining the received modification parameters into a modification set; and
applying the modification set to the source image in a single composite operation to generate a target image.

2. The method of claim 1, wherein the applying further comprises:
applying the modification parameters included in the modification set to the source image in accordance with a predetermined sequence regardless of an order in which the modification parameters were received.

3. The method of claim 1, further comprising:
storing the target image; and
storing with the target image reversion information for generating the source image from the target image.

4. The method of claim 1, wherein the graphical modification categories include pixel interchange, tonality/color modification, geometric modification, and special effects.

5. The method of claim 1, further comprising:
presenting an intermediate image based on the source image; and
applying the received modification parameters to the intermediate image as each modification parameter is received.

6. The method of claim 5, further comprising:
determining that a graphical modification cannot be represented in the intermediate image; and
disabling an operating control corresponding to the graphical modification.

7. The method of claim 5, further comprising:
restricting an operating control to one or more corresponding modification parameters that can be represented in the intermediate image.

8. The method of claim 1, further comprising:
automatically adjusting the first said modification parameter corresponding to the first said graphical modification category in response to receiving the second said modification parameter corresponding to the second said graphical modification category.

9. A computer-readable memory storing instructions thereon that are executable on a computing device to perform operations comprising:
concurrently presenting multiple operating controls corresponding to multiple graphical modification categories, the multiple operating controls that are presented corresponding to functionality that is determined to be supported by the computing device;
receiving modification parameters through the operating controls that indicate graphical modifications to be performed on a source image and include a first modification parameter corresponding to a first said graphical modification category and a second modification parameter corresponding to a second said graphical modification category;

combining the received modification parameters into a modification set; and applying the modification set to the source image in a single composite operation to generate a target image.

10. The computer-readable memory of claim 9, wherein the applying comprises:

applying the modification parameters included in the modification set to the source image in accordance with a predetermined sequence regardless of an order in which the modification parameters were received.

11. The computer-readable memory of claim 9, wherein the operations further comprise:

storing the target image; and storing with the target image reversion information for generating the source image from the target image.

12. The computer-readable memory of claim 9, wherein the graphical modification categories include pixel interchange, tonality/color modification, geometric modification, and special effects.

13. The computer-readable memory of claim 9, wherein the operations further comprise:

presenting an intermediate image based on the source image; and applying the received modification parameters to the source image to generate the intermediate image as each modification parameter is received.

14. The computer-readable memory of claim 13, wherein the operations further comprise:

determining that a graphical modification cannot be represented in the intermediate image; and disabling an operating control corresponding to the graphical modification.

15. The computer-readable memory of claim 13, wherein the operations further comprise:

restricting an operating control to one or more corresponding modification parameters that can be represented in the intermediate image.

16. The computer-readable memory of claim 9, wherein the operations further comprise:

automatically adjusting the first said modification parameter corresponding to the first said graphical modification category in response to receiving the second said modification parameter corresponding to the second said graphical modification category.

17. A system comprising:

a computer-readable medium configured to store a source image; and one or more processors configured to perform operations comprising:

concurrently presenting multiple operating controls that can be manipulated to specify modification parameters and correspond to multiple graphical modification categories, the multiple operating controls that can be manipulated determined based on capabilities that are supported by the system;

receiving modification parameters through the operating controls that indicate graphical modifications to be performed on the source image and include a first modification parameter corresponding to a first said graphical modification category and a second modification parameter corresponding to a second said graphical modification category;

combining the received modification parameters into a modification set; and applying the modification set to the source image in a single composite operation to generate a target image.

18. The system of claim 17, wherein the operations further comprise:

applying the modification parameters included in the modification set to the source image in accordance with a predetermined sequence regardless of an order in which the modification parameters were received.

19. The system of claim 17, wherein the operations further comprise:

storing the target image on the computer-readable medium; and storing with the target image reversion information for generating the source image from the target image.

20. The system of claim 17, wherein the graphical modification categories include pixel interchange, tonality/color modification, geometric modification, and special effects.

21. The system of claim 17, wherein the operations further comprise:

presenting on a display an intermediate image based on the source image; and applying the received modification parameters to the intermediate image as each modification parameter is received.

22. The system of claim 21, wherein the operations further comprise:

determining that a graphical modification cannot be represented in the intermediate image; and disabling an operating control corresponding to the graphical modification.

23. The system of claim 21, wherein the operations further comprise:

restricting an operating control to one or more corresponding modification parameters that can be represented in the intermediate image.

24. The system of claim 17, wherein the operations further comprise:

automatically adjusting the first said modification parameter corresponding to the first said graphical modification category in response to receiving the second said modification parameter corresponding to the second said graphical modification category.

* * * * *